United States Patent Office 2,948,594
Patented Aug. 9, 1960

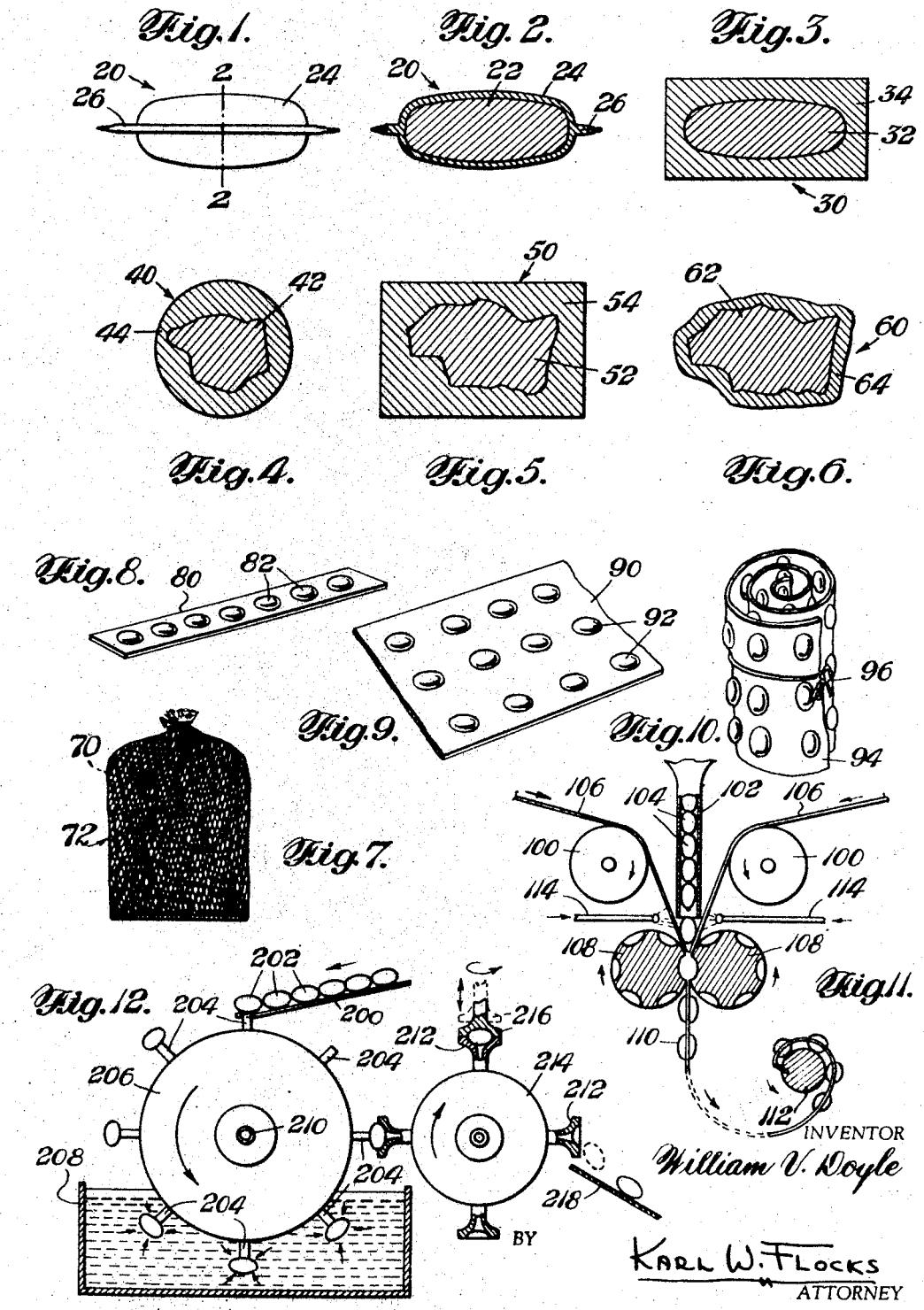

2,948,594

MOLDED PULP COATED CHARCOAL AND CHARCOAL BRIQUETTES

William V. Doyle, Chesterton, Ind., assignor to Diamond National Corporation, a corporation of Delaware Filed Aug. 6, 1956, Ser. No. 602,380

25 Claims. (Cl. 44—6)

This invention relates to fuel briquettes, and more particularly to self-starting or self-kindling charcoal and charcoal briquettes for use in building fires in open fireplaces, or in barbeque braziers, broilers and grilles employed in informal indoor and outdoor cooking.

The ordinary charcoal and charcoal briquettes which have heretofore been available in the commercial market have performed satisfactorily as a basic fuel, particularly convenient to use when only small quantities of fuel are required, as in cooking. However, such charcoal and charcoal briquettes have some disadvantages. Invariably, some excess loose powdered charcoal has been present, which creates a problem in preserving cleanliness. In an effort to solve this problem, small quantities of briquettes have been packaged in paper bags designed to be thrown as a unit into a stove without breaking open the package, but this has required the use of a fixed quantity of fuel, which sometimes may be too large or too small. Furthermore, ordinary charcoal briquettes are not self-kindling, and a considerable quantity of a more readily combustible material, such as kindling wood, must first be employed to ignite them.

An object of this invention is to provide a new and improved fuel briquette which is self-starting, being capable of becoming entirely ignited from the direct application of a single burning match or taper.

Another object of the invention is to provide a new and improved charcoal briquette possessing such cleanliness that it can be handled without soiling hands or clothing during preparations for building a fire.

Still another object of the invention is to provide a new and improved charcoal briquette capable of being packaged and merchandised in various forms in simple inexpensive containers.

Yet another object of the invention is to provide a new and improved charcoal briquette having an attractive surface appearance and coloration designed to enhance its sales appeal and facilitate the identification of manufacturers' brands.

In general, the foregoing objects are accomplished by forming a briquette comprising a lump of charcoal or compressed pulverized charcoal enveloped by an adherent coating of felted fibrous pulp. The coating may be molded onto the charcoal lumps in a variety of configurations, and each briquette may be provided with a projecting fin of molded pulp, which functions as a fuse and a spacer when groups of briquettes are piled together heterogeneously in building a fire.

Other objects and the nature and advantages of the instant invention will be apparent from the following description taken in conjunction with the accompanying drawings, wherein:

Fig. 1 is a perspective view of one form of an individual charcoal briquette embodying the invention;

Fig. 2 is a vertical sectional view taken along the line 2—2 of Fig. 1;

Fig. 3 is a sectional view of an individual charcoal briquette forming a second embodiment of the invention;

Fig. 4 is a median sectional view of an individual piece of charcoal in the form of a briquette forming a third embodiment of the invention;

Fig. 5 is a sectional view of an individual piece of charcoal in the form of a briquette forming a fourth embodiment of the invention;

Fig. 6 is a median sectional view of another form of individual piece of charcoal in the form of a briquette constituting a fifth embodiment of the invention;

Fig. 7 is a perspective view of a simple mesh bag filled with briquettes embodying the invention, showing a form of package suitable for storing or merchandising briquettes;

Fig. 8 is a perspective view of a unitary elongated strip of molded pulp having embedded therein a plurality of lumps of charcoal, which upon separation form individual briquettes embodying the invention;

Fig. 9 is a perspective view of a sheet of molded pulp having embedded therein a plurality of lumps of charcoal, which upon severance form individual briquettes embodying the invention;

Fig. 10 is a perspective view of an elongated sheet corresponding to the sheet shown in Fig. 9, rolled into spiral form suitable for merchandising briquettes;

Fig. 11 is a schematic view of one type of apparatus suitable for manufacturing briquettes in strip or sheet form, as shown in Figs. 7 and 8; and Fig. 12 is a schematic view of one type of apparatus suitable for manufacturing individual briquettes of the types illustrated in Figs. 1–6, inclusive.

Ordinary charcoal briquettes may be manufactured merely by compressing small quantities of pulverized charcoal to form molded lumps having any desired configuration. A small quantity of a suitable binding agent such as a combustible resin, may be admixed with the powdered charcoal to endow the molded lumps with some degree of structural strength. The resultant molded lumps ordinarily retain their shape without crumbling, unless they are subjected to relatively severe blows. Nevertheless, the molded lumps are still sufficiently friable for some particles of charcoal to be readily rubbed off the surfaces of the lumps, and some excess loose powdered charcoal is usually present.

In accordance with the present invention, each individual lump of charcoal or compressed pulverized charcoal is completely enveloped by an adherent coating of felted fibrous pulp. The pulp coating need not be very thick, provided it is sufficiently thick to protect the surface of the charcoal lump. However, in some cases it may be considered desirable to employ a thick coating of pulp, and in such cases the pulp coating itself may be molded in various configurations. The pulp coating keeps the lump briquette clean, while the pulp itself functions as a readily ignitable fuse, which renders the composite briquette self-starting or self-kindling, making unnecessary to employ any auxiliary kindling material for starting a fire.

In Figs. 1 and 2, there is shown a charcoal briquette indicated generally by the numeral 20, which represents the preferred embodiment of the invention. The briquette 20 comprises a core 22 composed essentially of compressed pulverized charcoal, and a coating 24 composed of felted pulp fibers formed thereon. The coating 24 may be molded on the core 22 by methods involving dipping, spraying, or any other suitable means for depositing felted fibers. The core 22 is approximately elliptical in vertical cross-section. The coating 24 approximately uniform in thickness, it conforms generally to the configuration of the core 22, and it completely covers the core 22. Formed integrally with the coating 24 is a projecting fin 26 composed of molded pulp fibers, shown located at the vertical midpoint of composite briquette. The fin 26 may extend circumferentially entirely around the briquette, or it may extend only partially around it. This fin advantageously functions as a fuse and a spacer when groups of briquettes are piled together haphazardly in building a fire. As a spacer, the fin 26 allows drafts of air to supply needed additional oxygen in the interior of a pile of briquettes. In this manner, each briquette is rendered capable of catching fire more easily and quickly.

Fig. 3 shows a briquette 30 forming a second embodiment of the invention. The briquette 30 is provided with a compressed pulverized charcoal core 32, which in configuration and structure resembles the core 22 shown in Fig. 2 for the preferred embodiment. The core 32 is completely covered by a relatively thick molded pulp coating 34. This coating is approximately square or rectangular in cross-section, as shown in Fig. 3, and it is approximately cubical in overall shape. The edges and corners of the coating 34 serve as fuses and spacers for the briquette 30, in the same way that the fin 26 performs on the briquette 20.

In the third embodiment of the invention, shown in Fig. 4, a briquette 40 comprises an irregular lump of charcoal core 42, and a relatively thick molded pulp coating 44. The coating 44 completely covers and adheres tightly to the core 42. The exterior of the coating 44 is circular in cross-section, as shown in Fig. 4, and it is spherical in overall shape. It is evident that this shape results in the formation of the desired spaces between adjacent briquettes, when a plurality of them are heaped in a pile in preparation for building a fire.

In the embodiment shown in Fig. 5, a briquette 50 comprises a charcoal core 52 which is similar in composition and in configuration to the core 42 of Fig. 4. However, the core 52 is completely covered by a relatively thick pulp coating 54 which is molded in form of a cube, or some other regular hexahedron.

Instead of molding thick pulp coatings to form regular predetermined shapes, as in the embodiments shown in Figs. 3, 4 and 5, it may be considered satisfactory to form thin pulp coatings conforming to any irregularly shaped core, as shown in Fig. 6. In this embodiment, a briquette 60 includes an irregular charcoal core 62 corresponding in composition and configuration to the cores 42 and 52 of Figs. 4 and 5, respectively. The core 62 is completely covered by a relatively thin pulp coating conforming to the irregular shape of the core 62.

Due to the cleanliness made possible by their pulp coatings, the briquettes shown in Figs. 1 to 6, inclusive, may be conveniently handled, stored and merchandised individually in any desired number, in the same manner as oranges or any other small unitary commodity. They may be handled and stored loosely, or they may be packaged in any suitable simple inexpensive container. As an example, Fig. 7 shows a plurality of briquettes 70 embodying the invention, enclosed within a simple large mesh bag 72 of the type commonly employed to store oranges. In this type of container, the briquettes are clearly visible, which fact may increase the sales appeal of the product.

Briquettes embodying the invention may be packaged and merchandised in other convenient ways. Fig. 8 shows a unitary elongated strip 80 composed of felted pulp, in which a plurality of lumps 82 of compressed pulverized charcoal are embedded at intervals throughout the length of the strip. Such strips may be sold by the yard. Any desired number of individual briquettes embodying the invention may be obtained by severing the strip 80 into units each containing one of the lumps.

The strip 80 may have an indefinite length, and it may be molded continuously while simultaneously embedding the lumps 82 therein, in a manner to be described hereinafter in connection with a description of apparatus shown in Fig. 11.

Fig. 9 shows a sheet 90 composed of felted molded pulp in which a plurality of lumps 92 of compressed pulverized charcoal are embedded in uniformly spaced columns and rows. In other respects, the sheet 90 is similar to the strip 80 shown in Fig. 8. The strip 90 can be readily cut into units each containing one of the lumps 92, thereby forming individual briquettes embodying the invention. In area, the sheet 90 may have any convenient size, to enable stacks of such sheets to be arranged on shelves for storage or sale. If desired, longer sheets, otherwise corresponding to the sheet 90, may be rolled into a spiral form for convenient storage. For example, Fig. 10 shows a spirally rolled sheet 94, similar to the sheet 90, secured in its spiral form by a string 96. In this form, sheets of briquettes may be sold by the bundle or by sections thereof.

In the manufacture of strips and sheets having embedded lumps of charcoal, such as the strip 80 and the sheet 90 shown in Figs. 8 and 9, respectively, apparatus of the type shown schematically in Fig. 11 may be employed. This apparatus includes a pair of rolls 100 over which passes previously prepared felted pulp molded in sheet form on opposite sides of a chute 102 which contains a stack of lumps 104 composed of compressed pulverized charcoal. Over the rolls 100 a pair of pulp webs 106 are drawn continuously and fed into the bite between a pair of cooperating compression rollers 108 mounted beneath the chute 102. The lumps 104 are dispensed in predetermined order by mechanism not shown from the chute 102 into the bite between the sheets 106, resulting in the formation of a composite laminated strip 110 corresponding in structure to the strip 80 or the sheet 90. The strip 110 may be continuously wound into a spiral form on a takeup reel 112. A pair of water supply pipes 114 may be mounted above the rollers 108 for spraying water upon the sheets 106 just before they enter the bite between the rollers 108, in order to dampen the sheets 106 sufficiently to enable the rollers 108 to mold them together in laminated form.

In Fig. 12, there is shown schematically one type of apparatus suitable for the production of the briquettes illustrated in Figs. 1 to 6, inclusive. This apparatus includes a plural member chute 200 from which a plurality of lumps 202 of compressed pulverized charcoal are dispensed one at a time to a series of suction tubes 204 projecting radially from the periphery of a rotatable carrier 206. The tubes 204, which extend between the plural members of chute 200, receive the lumps 202 from the chute 200 and advance them successively through an open tank 208 containing liquid pulp slurry, which may be a suspension of pulp fibers in water. Due to the fact that the lumps 202 of compressed charcoal are porous, the suction applied by the tubes 204 causes pulp fibers to be extracted from the slurry in the tank 208, and deposits the fibers in layers coating the exterior surfaces of the lumps 202. Excess water is sucked through the interiors of the lumps 202, thence inwardly through the tubes 204, to a central hollow shaft 210 on which the carrier 206 is rotatably mounted.

As the result of being dipped into the pulp slurry contained in the tank 208, the charcoal lumps 202 are completely coated with a layer of wet pulp fibers, except for the small circular areas where the lumps were engaged by the suction tubes 204. These small uncoated areas may be covered by spreading the surrounding layers of wet pulp by means of a blowing or a rubbing action. This may be accomplished by transferring the coated lumps 202 successively from the tubes 204 to a series of female dies 212 projecting radially from the periphery of a rotatable carrier 214. Rotation of the carrier 214 advances the dies 212 in timed relation to the movement of the tubes 204 on the carrier 206, and thereby advances the lumps 202 to a reciprocable male die 216. Acting in cooperation with each successive female die 202, the male die 216 spreads the wet pulp coating across the surface of each lump 202 by a blowing or a rubbing action. At the same time, the pulp coating on each lump may be molded to form a projecting fin, such as the fin 26 shown in Figs. 1 and 2. Finally, the completely coated lumps 202 are advanced to a discharge chute 218 leading to a drying device (not shown).

While it is preferred to spread the pulp fibers over the incompletely coated charcoal lumps 202 in the above-described manner, in order to cover said lumps completely with a uniform adherent coating of felted fibrous pulp, it is apparent that the incompletely coated charcoal lumps 202 are directly usable for the stated purposes of the invention. Thus, even though a small area of each charcoal lump 202 may lack a coating of the pulp fibers, it is still usable advantageously as a charcoal fuel, and this applies equally to all of the illustrated embodiments of the invention.

It is evident that the type of apparatus illustrated in Fig. 12 is capable of producing briquettes having various configurations, corresponding to any one of the embodiments of the invention shown in Figs. 1 to 6, inclusive. The suction tubes 204 are capable of engaging and gripping charcoal lumps having practically any regular or irregular configuration. Where necessary, other types of gripping devices may be substituted for the suction tubes 204. Furthermore, other types of dipping apparatus may be used in place of the rotatable carrier 206. Thick coatings of pulp may be deposited on the charcoal lumps in the tank 208, and the cooperating dies 212 and 216 may be suitably formed to mold the pulp into the spherical and cubical shapes shown in Figs. 3, 4 and 5.

The materials employed in the manufacture of briquettes employing the invention are ordinary pulverized charcoal or lumps of charcoal and ordinary wood pulp fibers. A small amount of a resinous binding agent may be incorporated into the charcoal. Any readily combustible cheap grade of pulp is suitable. If desired, various dyes may be incorporated into the pulp to produce briquettes having any desired color. Bright colors might add to the attractiveness of the briquettes, thereby increasing sales and identifying manufacturers' brands.

The principles of the invention have been illustrated and described in several different embodiments. However, it is evident that briquettes embodying the invention may be made in many other shapes and forms, and that other apparatus and methods may be employed for their manufacture.

It will be obvious to those skilled in the art that various changes may be made without departing from the spirit of the invention and therefore the invention is not limited to what is shown in the drawings and described in the specification but only as indicated in the appended claims.

What is claimed is:

1. A charcoal fuel comprising a lump of charcoal, an adherent coating of felted fibrous pulp molded around and completely covering the lump, and a projecting fin of molded fibrous pulp formed integrally with and extending circumferentially around the coating on the exterior of the lump.

2. A charcoal fuel comprising a lump of charcoal enveloped by an adherent self-kindling coating of felted fibrous pulp.

3. A charcoal fuel comprising a briquette of compressed pulverized charcoal, and an adherent self-kindling layer of felted fibrous pulp molded around and substantially completely covering said briquette.

4. A charcoal fuel comprising a briquette of compressed pulverized charcoal, an adherent coating of felted fibrous pulp molded around and completely covering the briquette, and a projecting fin of molded fibrous pulp formed integrally with and extending circumferentially around the coating on the exterior of the briquette.

5. A charcoal fuel comprising a briquette of compressed pulverized charcoal having a shape approximately elliptical in vertical cross-section, a relatively thin adherent coating of felted fibrous pulp completely covering the briquette in conformity with the shape of the briquette, and a projecting fin of molded fibrous pulp formed integrally with and extending circumferentially around the coating on the exterior of the briquette.

6. A charcoal fuel comprising a lump of charcoal, and a relatively thick adherent coating of felted fibrous pulp completely covering the lump and molded into an approximately cubical configuration.

7. A charcoal fuel comprising a briquette of compressed pulverized charcoal having a shape approximately elliptical in vertical cross-section, and a relatively thick adherent coating of felted fibrous pulp completely covering the lump molded into an approximately cubical configuration.

8. A charcoal fuel comprising an irregularly shaped lump of charcoal, and a relatively thick adherent coating of felted fibrous pulp completely covering the lump and molded into a regular geometrical configuration.

9. A packaged charcoal fuel for braziers and the like, comprising an elongated strip of indefinite length molded from felted fibrous pulp, and a plurality of lumps of charcoal embedded in the strip at intervals along its length.

10. A packaged charcoal fuel for braziers and the like, comprising an elongated strip of indefinite length molded from felted fibrous pulp, and a plurality of briquettes of compressed pulverized charcoal embedded in the strip at intervals along its length.

11. A method of making charcoal fuel, comprising the steps of molding a layer of felted fibrous pulp completely around a lump of charcoal, and molding a projecting fin of fibrous pulp on said layer.

12. A method of making charcoal fuel, comprising the steps of forming a briquette of compressed pulverized charcoal, molding a layer of felted fibrous pulp completely around the briquette, and molding a projecting fin of fibrous pulp on said layer.

13. A method of making pulp coated charcoal briquettes, comprising the steps of dipping a lump of compressed pulverized charcoal into liquid pulp slurry, applying suction to the lump to deposit a layer of wet fibrous pulp on the surface of the lump, and then spreading the deposited pulp across the surface of the lump to cover it completely.

14. A method of making pulp coated charcoal briquettes, comprising the steps of successively dipping a plurality of lumps of compressed pulverized charcoal into liquid pulp slurry, applying suction to a portion of the surface of each lump to deposit a layer of wet fibrous pulp on the surface of the lump, successively advancing the coated lumps to a pair of cooperating compression dies, and compressing the lumps between the dies thereby spreading the deposited pulp across the surfaces of the lumps to cover them completely and form an integral projecting fin of molded pulp thereon.

15. A method of making pulp coated charcoal fuel in the form of strips and sheets, comprising the steps of advancing a pair of sheets of felted fibrous pulp toward each other and into the bite between a pair of cooperating compression rollers, successively dispensing lumps of charcoal into the bite between the advancing sheets, and molding the sheets around the lumps to embed them therein.

16. A charcoal fuel comprising an irregularly shaped lump of charcoal, and an adherent coating of felted fibrous pulp molded around and completely covering the lump of charcoal, said coating conforming approximately to the shape of the lump of charcoal and being approximately uniform in thickness over its entire area.

17. The charcoal fuel defined by claim 8, wherein the felted fibrous pulp coating is molded into a generally spherical configuration.

18. The charcoal fuel defined by claim 8, wherein the ted fibrous pulp coating is molded into a generally cylindrical configuration.

19. A packaged charcoal fuel for braziers and the like, comprising a sheet of felted fibrous pulp, and a plurality of lumps of charcoal spaced in a plurality of adjacent rows and columns embedded in the sheet throughout its area, said sheet being molded around and forming an adherent covering over substantially all of the surface area of each of said lumps.

20. A packaged charcoal fuel for braziers and the like, comprising a plurality of briquettes of compressed pulverized charcoal admixed with a resinous binding agent and molded into a predetermined shape, said briquettes being spaced in a plurality of adjacent rows and columns, and a sheet of felted fibrous pulp molded around and forming an adherent covering over substantially all of the surface area of each of said briquettes.

21. A charcoal fuel comprising a lump of charcoal, and an adherent layer of felted fibrous pulp molded around and covering substantially all except a small area of the surface of said lump.

22. The charcoal fuel defined by claim 21, wherein the lump of charcoal is a briquette of compressed pulverized charcoal admixed with a resinous binding agent.

23. A packaged charcoal fuel for braziers and the like, comprising a plurality of lumps of charcoal spaced in a plurality of adjacent rows and columns, and a pair of sheets of felted fibrous pulp molded onto opposite sides of said lumps to embed them between the sheets, said sheets being united to each other and being molded around each of said lumps to form an adherent covering over substantially all of the surfaces thereof.

24. The packaged charcoal fuel defined by claim 23, wherein each lump of charcoal is a briquette of compressed pulverized charcoal admixed with a resinous binding agent.

25. A method of making a packaged charcoal fuel, comprising the steps of arranging a plurality of lumps of charcoal in a plurality of adjacent spaced rows and columns, embedding said prearranged lumps between a pair of sheets of felted fibrous pulp, and molding the sheets around the lumps to unite the sheets to each other and to form adherent coverings over substantially all of the surfaces of said lumps.

References Cited in the file of this patent

UNITED STATES PATENTS

| | | |
|---|---|---|
| 747,282 | Wallgren | Dec. 15, 1903 |
| 1,481,866 | Heist | Jan. 29, 1924 |
| 2,012,405 | Salfisberg | Aug. 27, 1935 |
| 2,094,661 | Macleay et al. | Oct. 5, 1937 |
| 2,240,335 | Keil | Apr. 29, 1941 |
| 2,242,372 | Schneider | May 20, 1941 |
| 2,257,573 | Randall | Sept. 30, 1941 |
| 2,666,695 | Brody | Jan. 19, 1954 |
| 2,760,412 | Lemieux | Aug. 28, 1956 |
| 2,799,563 | Shenker | July 16, 1957 |
| 2,822,251 | Swinehart et al. | Feb. 4, 1958 |

FOREIGN PATENTS

| | | |
|---|---|---|
| 13,637 | Great Britain | Aug. 26, 1887 |
| 85,358 | Switzerland | June 1, 1920 |